Patented Aug. 17, 1948

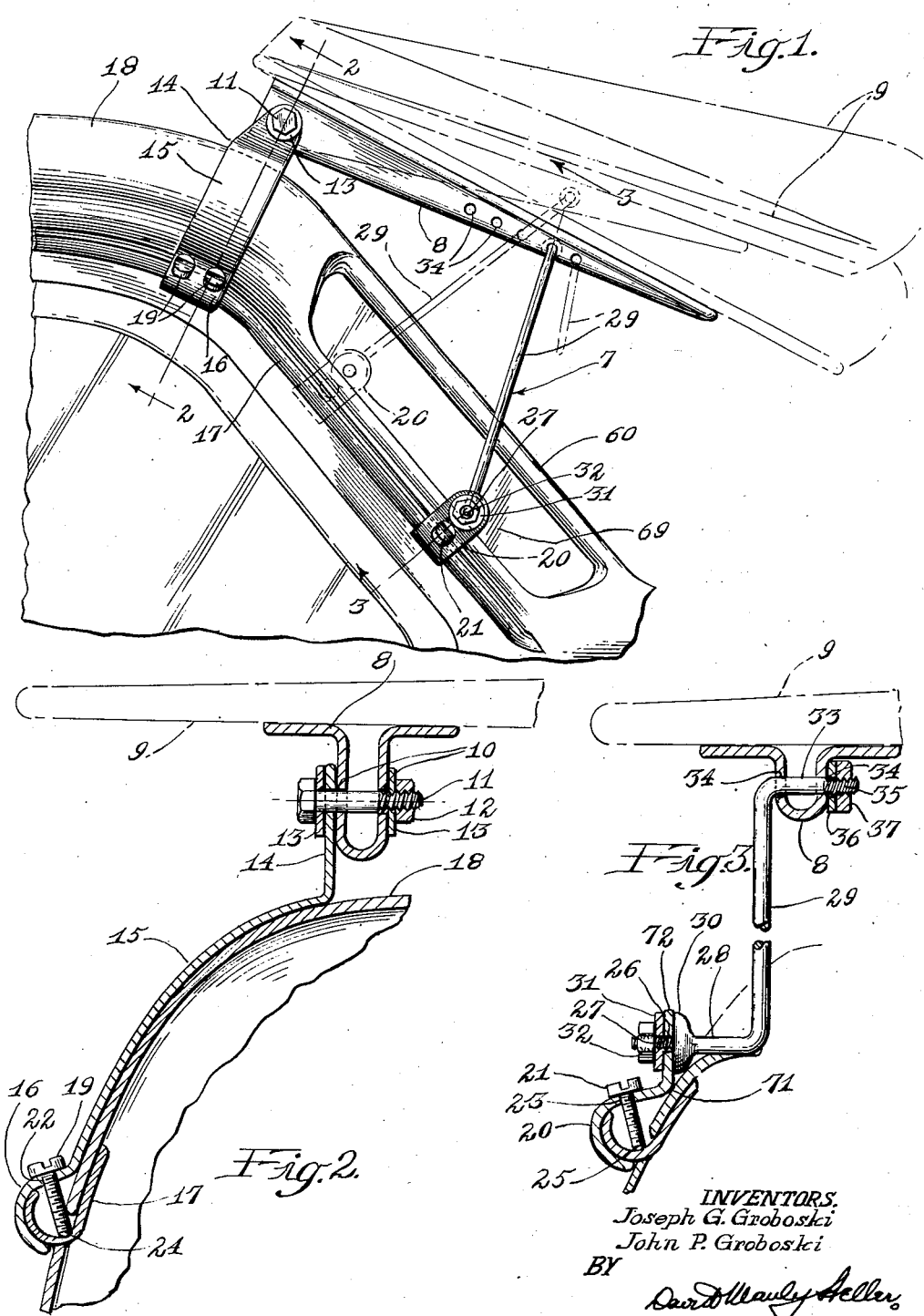

2,447,246

UNITED STATES PATENT OFFICE 2,447,246

ADJUSTABLE ANGULAR BRACKET MEANS FOR SUN VISORS

John P. Groboski, River Forest, and Joseph G. Groboski, Chicago, Ill.

Application June 18, 1947, Serial No. 755,418

1 Claim. (Cl. 296—95)

Our invention relates to vehicle shade brackets and angular adjustment means therefor.

An object of our invention is to provide a vehicle shade bracket, which may be attached to the top of any modern type automobile without making a hole in or otherwise damaging the said car top; this is accomplished by attaching the bracket with screws to the rain gutter of the car which, in most cars, runs in a line parallel with the roof of the car.

A further object of our invention is to provide an adjustment means for the car shade which will also be adjustably attached by a screw to the rain gutter of the car.

A still further object of our invention is to provide, in the visor-holding bracket, a number of holes into one of which may be set the adjustment means in order to provide a greater range of adjustability.

Other objects and advantages inherent in our invention will become readily apparent from the ensuing description and the accompanying drawings, in which like parts are designated by like numerals, and in which:

Fig. 1 represents a side view of a portion of a car top including the windshield, and showing our invention attached thereto with a car visor shown in phantom lines.

Fig. 2 shows a cross-sectional view taken substantially on line 2—2 of Fig. 1.

Fig. 3 represents a cross-sectional view taken substantially on line 3—3 of Fig. 1.

Referring to the illustrations, our invention is generally designated 7 and consists of an elongated support bracket 8 which is attached to the bottom side of the car shade 9. The bracket 8 is U shaped in cross section and tapers from its outer end to its rear end wherein a hole 10 is drilled, through which a bolt 11, together with washers 13 and lock nut 12, hold pivotably a bracket 14. The fastening bracket 14 is arcuately bent at 15 to conform to the rounded side of the car top 18 and its lower end 16 is further bent semicircularly to encompass the curved section of the rain gutter 17, which is, in most cars, located along the edge of the car roof in a line configurative with the top of the car and extending downwardly to the lower edge of the windshield.

Two holes 22 are drilled and tapped in the top side of the semicircular portion 16 to hold two screws 19; the ends 24 of the screws 19 being pointed to give locking bearing against the inside surface of the rain gutter 17. Since the semicircular curve 16 of bracket 14 encompasses the rain gutter 17 and the arcuately bent portion 15 bears against the curved surface 18 of the top of the car, tightening of the screws 19 will afford a firm and immovable seating and locating attachment for the bracket 14 to the top 18 of the car. Bracket 14 is preferably located at the point on the car top where it bends downward to join the windshield, but may be adjustably set at any convenient place along the rain gutter 17.

The adjustable means of our invention consists of a companion bracket 20, shaped semi-circularly, to encompass the rain gutter 17 and fastened thereto by the conical tip 25 of the screw 21. The companion bracket 20 is tapped at 23 to receive the screw 21, making available a resting knee 71 to bear against the side of the windshield.

The top ear 72 of the bracket 20 has a drilled hole 26, which supports the threaded portion 27 of the bent end 28 of a rod 29. The end 28 is formed outwardly at 30 to provide a shoulder which together with washer 31 and lock nut 32 pivotably holds the rod 29 to the bracket 20. The top of the rod 29 is bent at 33 forming a Z shape to the rod and it is threaded at 35. A number of holes 34 are drilled through the visor holding bracket 8 and, into one of these holes, the end 33 of the rod 29 is pivoted and held by washer 36 and lock nut 37.

The car shade bracket 14 is attached to the top of a car 8 by placing the curved part of bracket 14 against the curving edge of the car top so that the rounded end 16 fits over the rain gutter 17, the screws 19 are subsequently tightened. Similarly, the bracket 20 is placed over the rain gutter 17 and its screw 21 is tightened at whatever point on the rain gutter 17 that is desirable.

It may be seen by the dotted lines in Fig. 1 that, by adjusting the bracket 20 at various points along the rain gutter 17, a different angle will be given to the bracket 8 and its visor 9 which are pivoted to the bracket 14. To afford an even greater range of angular movement for the bracket 8, the rod 29 may be set into any one of a number of the aforementioned holes 34 provided in the bracket 8.

Although there is herein shown and described preferred embodiments of our invention, it is nevertheless to be understood that minor changes may be resorted to without departing from the scope and spirit of our invention as set forth in the appended claims.

Having thus described and disclosed our invention, what we claim as novel, and desire to secure by Letters Patent, is:

Sun visor adjustable support means comprising, stationary support bracket means securable to the rain gutter of an automobile and provided with an arcuate saddle portion configurative with the top portion of the body of said automobile, sun visor bracket means articulately secured to the said support bracket means and provided with a number of drilled openings, companion bracket means slidably securable to the said rain gutter and adjustably positionable with respect to the said stationary support bracket means, and Z shaped rod means having one of its ends articulately secured to the said companion bracket means, its other end being secured at one of the drilled openings in the said sun visor bracket means.

JOHN P. GROBOSKI.
JOSEPH G. GROBOSKI.

REFERENCES CITED

The following references are of record in the file of this patent:

UNITED STATES PATENTS

| Number | Name | Date |
| --- | --- | --- |
| 1,807,879 | Simon | June 2, 1931 |
| 1,841,986 | Simon | Jan. 19, 1932 |
| 2,180,909 | Peckat | Nov. 21, 1939 |
| 2,253,353 | Sharp | Aug. 19, 1941 |
| 2,334,856 | Atkinson | Nov. 23, 1943 |